Sept. 1, 1970     J. ALBERANI ET AL     3,526,384

FUEL TRIMMING VALVE

Filed Oct. 26, 1967

JULIUS ALBERANI
CARL F. SCHORN
INVENTOR.

BY *Walter Patorsko, Jr.*

ATTORNEY

United States Patent Office 3,526,384
Patented Sept. 1, 1970

3,526,384
FUEL TRIMMING VALVE
Julius Alberani, Dearborn, and Carl F. Schorn, Birmingham, Mich., assignors to Holley Carburetor Company, Warren, Mich., a corporation of Michigan
Filed Oct. 26, 1967, Ser. No. 678,341
Int. Cl. F16k *31/12;* F02c *9/10*
U.S. Cl. 251—14      8 Claims

ABSTRACT OF THE DISCLOSURE

This application discloses what may be termed as a fuel trimming valve adapted for, but not necessarily limited to, use in a gas turbine engine powered aircraft armed with forward firing rockets for automatically reducing, by some fixed percentage, the total fuel metered to the engine by the engine fuel control, the device being self-compensating for variations in fuel temperature and preferably actuated simultaneously with the firing of the rockets, in order to prevent overspeeding or over temperature of the engine that may otherwise result from increased compressor intake temperature due to the aircraft flying into the hot exhaust stream of the rocket.

BRIEF SUMMARY OF THE INVENTION

This invention relates generally to gas turbine engine fuel systems, and more particularly to a device that may be used to at times modify, by some fixed percentage, the quantity of fuel metered by the fuel control before the metered fuel is supplied to the engine.

In a conventional gas turbine engine, metered fuel from the fuel control is fed directly into the engine. However, in some situations, as in the case of a gas turbine engine powered aircraft armed with forward firing rockets, it has been found necessary or desirable to automatically reduce, by some fixed percentage, the total fuel metered to the engine by the engine fuel control in order to prevent overspeeding or over temperature of the engine that would otherwise result from increased compressor intake temperature due to the aircraft flying into the hot exhaust stream of the rocket.

Although conventional gas turbine engine fuel controls are equipped with temperature sensors to enable compensation for changes in air inlet temperature, these sensors do not operate fast enough to solve the above problem. Therefore, a device as disclosed herein, is needed to automatically reduce the fuel supplied by the fuel control when the aircraft is flying into the hot exhaust stream of the rocket.

When inoperative, the invention, which may be termed a fuel trimming valve, merely receives and passes all of the metered fuel from the fuel control to the engine burner. When energized, as by closing a switch when the rockets are fired, the fuel trimming valve receives all of the metered fuel from the fuel control, bypasses to the inlet side of the fuel pump a constant percentage of the metered fuel received and passes the remaining metered fuel to the engine burner. When the aircraft has passed through the hot exhaust stream, the fuel trimming valve can be returned to the unenergized state by any convenient means, for example by manually opening the switch used to energize the trimming valve or a time delay system in the energizing circuitry.

Accordingly, a main object of this invention is to provide a fuel trimming valve for bypassing a percentage of the fuel metered by the fuel control to the fuel pump inlet to prevent overspeeding or over temperature of the gas turbine engine.

Another object of this invention is to provide such a fuel trimming valve wherein, upon an electrical or other signal, the valve automatically modulates the fuel flow to the gas turbine engine by bypassing a constant percentage of metered fuel from the fuel control to the fuel pump inlet.

A third object of this invention is to provide such a fuel trimming valve wherein the valve can be attached to a conventional fuel control without substantial modification of the existing control.

Another object of this invention is to provide such a fuel trimming valve wherein an external adjustment is provided to vary the percentage of metered fuel bypassed to the fuel pump inlet.

A further object of this invention is to provide such a fuel trimming valve that will operate properly with unfiltered fuel.

Another object of this invention is to provide such a fuel trimming valve wherein any malfunction of the unit must result from the unlikely failure of both a diaphragm and freezing of the back-up piston by contaminants.

Another object of this invention is to provide such a fuel trimming valve that is inherently self-compensating for changes in fuel density and changes in spring modulus due to temperature.

A further object of this invention is to provide such a fuel trimming valve wherein the pressure drop thereacross is maintained substantially constant.

Another object of this invention is to provide such a fuel trimming valve wherein, in one embodiment thereof, the pressure drop through the valve is relatively insignificant when the valve is not bypassing fuel to the fuel pump inlet.

A further object of this invention is to provide such a fuel trimming valve wherein, if it is used on a gas turbine engine powered aircraft armed with forward firing rockets and actuated at the time the rockets are fixed, the reaction time thereof is adequate to prevent overspeeding or over temperature of the engine due to the aircraft flying into the hot exhaust stream of the rockets.

These and other objects and advantages of the invention will become more apparent upon reference to the detailed description and the accompanying drawings.

DETAILED DESCRIPTION

Figure 1:
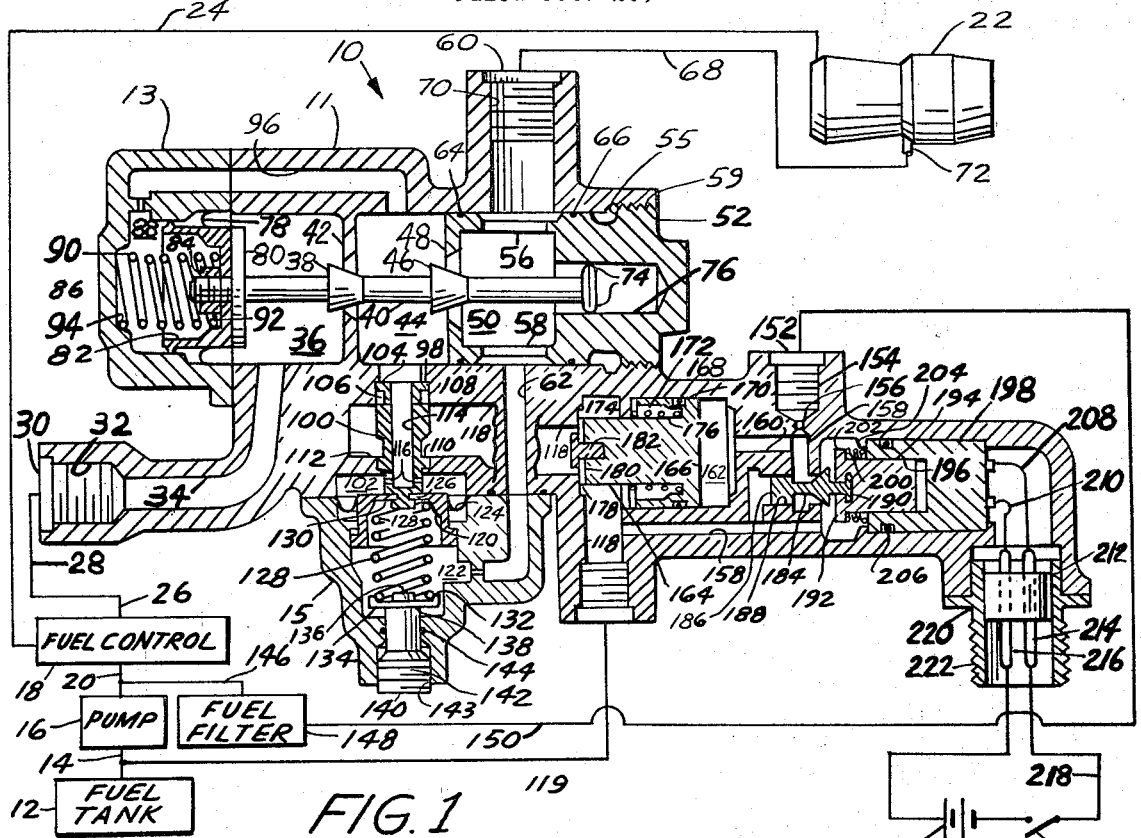
FIG. 1 is a schematic cross-sectional view of a device embodying the invention, the device being shown in conjunction with a gas turbine engine fuel system.

Referring now to FIG. 1, a fuel trimming valve 10 may comprise housing members 11, 13 and 15. Fuel from tank 12 is pumped through conduit 14 by pump 16 and into fuel control 18 through conduit 20. Fuel control 18 responds to any desired operating parameters of gas turbine engine 22 as represented schematically by connection 24. Fuel control 18, gas turbine engine 22 and pump 16 are not described herein, since the specific design of these well known components is not critical to the operation of the fuel trimming valve 10.

Metered fuel from fuel control outlet 26 flows through conduit 28 to fuel trimming valve inlet port 30 containing internal threads 32 formed therein for connection to the conduit, and fuel flows from port 30 to chamber 36 through internal conduit 34 formed in housing member 11. From chamber 36, fuel flows around metered flow valve 38 formed on shaft 40 and through valve seat 42, which forms a port between chambers 36 and 44. The fuel then flows around engine flow valve 46 similarly formed on shaft 40 and through valve seat 48, which forms a port between chambers 44 and 50.

Valve seat 48 is formed on the adjustable member 52 which is secured in housing member 11 by external threads 54 engaging internal threads 55. By threadably adjusting the opening of valve 46/48 such that it is equal to the opening of valve 38/42, the flow areas of the two flow valves remain equal during the operation of the fuel trimming valve 10, since both flow valves 38/42 and 46/48 are structurally identical and both valves 38 and 46 are formed on shaft 40. Outlet ports 56 and 58 are formed in member 52 and communicate chamber 50 with external port 60 and internal conduit 62, respectively, the O-ring seals 64 and 66 preventing leakage of fluid around member 52.

From chamber 50, fuel flows through port 56 and external port 60 and into conduit 68, external port 60 being formed with internal threads 70 for connection to conduit 68. From conduit 68, fuel flows into the gas turbine engine fuel inlet 72.

The end of shaft 40 adjacent chamber 50 is slidably mounted on guides 74 in cylinder 76 formed in member 52. The opposite end of shaft 40, adjacent chamber 36, is fixedly secured to metered flow valve diaphragm 78 by means of washer 80, back-up piston 82 and nut 84. Washer 80 is first placed over the end of shaft 40, followed by the diaphragm 78 and the piston 82, and finally the nut 84 is tightened down on threads 86 formed on shaft 40 to secure the diaphragm between the washer and piston. The outer edge of the diaphragm is secured between housing members 11 and 13, which are secured by any convenient means. As noted from the above construction, since diaphragm 78 forms one wall of chamber 36 it is subjected on one side to the fluid pressure in chamber 36.

Back-up piston 82 is slidably mounted in chamber 88 formed in member 13. Spring 90 in chamber 88 has one end seated on spring rest 92 formed on piston 82 and the other end on spring rest 94 formed in member 13 so as to exert an essentially constant force tending to close valve 38/42 and 46/48. Since conduit 96 communicates the fluid pressure in chamber 44 with chamber 88, diaphragm 78 is responsive to the pressure differential between chambers 36 and 44. Shaft 40 is actuated, which in turn regulates flow valve 38/42, by diaphragm 78 and spring 90 so as to maintain a constant pressure drop across valve 38/42 regardless of the fluid flow therethrough. Since the pressure drop across valve 38/42 is constant, the fuel flowing therethrough is a direction function of the area thereof.

Port 98 and constant pressure bypass valve 100 communicate chamber 44 with chamber 102. Bypass valve 100 is slidably mounted in cylinder 106 on guides 104. Edge 108 forms one of the valve means of valve 100 with cylinder 106 forming a seat, and radially extending flange 110 of valve 100 forms the other valve means to function with valve seat 112 formed on housing 11. When bypass conduit 118 is open to flow, fluid from chamber 44 flows through port 98 to an opening 114 formed through the center of valve 100, out ports 116 formed in valve 100 to chamber 102 and out valve 110/112 into conduit 118. Also, fuel from chamber 44 passes through port 98, around guides 104 and through valve 106/108 into conduit 118. From conduit 118 fuel flows through conduit 119 into conduit 14, which is the fuel pump inlet conduit.

The end of bypass valve 100 adjacent chamber 102 is fixedly secured to back-up piston 120 slidably mounted in chamber 122. The inner diameter of bypass valve diaphragm 124 is secured between piston 120 and the surface 126 formed on valve 100, with the outer diameter being secured between housing members 11 and 15. One end of coil spring 128, which exerts an essentially constant force on back-up piston 120, rests against seat 130 formed on piston 120, while the other end of spring 128 rests on washer 134, which is provided with a flange 132 to prevent the spring from slipping off the washer. Washer 134 is seated over projection 136 and rests on edge 138 formed on adjustable member 140, which is provided with external threads 142 for engaging internal threads 143 formed in housing member 15. The O-ring seal 144 between members 140 and 15 prevents leakage of fuel around member 140.

Since conduit 62 communicates chamber 50 with chamber 122 and diaphragm 124 forms a wall between chambers 102 and 122, the diaphragm is responsive to the pressure differential between chambers 44 and 50. When the diaphragm is moved in response to this pressure differential, it, in turn, moves bypass valve 100.

Conduit 146 extends from conduit 20 to any suitable fuel filter 148 and then via conduit 150 to filtered fuel inlet port 152 containing threads 154 therein for connection to the conduit. Fuel entering port 152 flows through filtered fuel restriction 156 into internal conduit 158 with conduit 160 communicating the fluid pressure in conduit 158 with chamber 162. Bypass fuel shut-off valve 164 is slidably mounted in chamber 162, with the fluid pressure from conduit 160 acting on surface 166 formed on valve 164, and O-ring 168 being mounted in groove 170 to prevent leakage of fuel from chamber 162 around valve 164. Coil spring 172 is mounted between flange 174 formed on housing 11 and surface 176 on valve 164 to create a force on the valve opposing the force of the fluid pressure from conduit 160 acting on surface 166. Valve seat 178, which forms the seating arrangement for valve 164, is positioned in conduit 118 downstream of bypass valve 100. Valve 164 may be fitted with a hard rubber insert 180 or other suitable material held in place by screw 182 to enable a fluid tight seal to be formed with seat 178.

Solenoid valve 184 is positioned in conduit 158 downstream of conduit 160. One end of valve 184 has a piston shaped member 186 attached thereto which is slidably mounted in cylinder 188, the other end of valve 184 having an outwardly extending flange 190 for engaging inwardly extending flange 192 formed on solenoid armature 194, which is slidably mounted in cylinder 196 formed in armature coil 198. Coil spring 200 seated on flange 202 formed on armature 194 and surface 204 on coil 198 exerts a force on the armature tending to close valve 184. O-ring seal 206 formed around coil 198 prevents leakage of fuel past the coil.

Solenoid coil 198 is connected by electrical leads 208 and 210 to plug 212 having members 214 and 216 for connection into circuit 218. Plug 212 is press fitted or held in by any other suitable means into member 220, which is similarly press fitted or held in by any other suitable means into housing 11 and contains external threads 222 for securing the connection to members 214 and 216. Circuit 218 contains a D.C. source 224 and a switch 226 for energizing solenoid coil 198.

When switch 226 is in the open position, solenoid 198 is not energized, and solenoid armature 194 is pushed out of cylinder 196 by spring 200. With the armature in this position, solenoid valve 184 is in the closed position. High pressure filtered fuel from conduit 160 acts on surface 166 of shut-off bypass valve 164. The fluid pressure in chamber 162 acting on surface 166 is very nearly the same as it is at the inlet port 152, since the leakage around valve 184 while in the closed position is very small. This fluid pressure acting on surface 166 creates a force on valve 164 sufficient to overcome the force of spring 172 tending to open the valve, therefore, the valve 164 will be in the closed position stopping fuel flow through conduit 118.

When switch 226 is closed to energize coil 198, spring 200 is overcome and armature 194 is drawn into cylinder 196 and valve 184 is opened. Filtered fuel is then allowed to flow from inlet 152, through restriction 156 and into conduit 158, around solenoid valve 184 in conduit 158 and into conduit 118. Since the flow area of restriction 156 is small in comparison to the rest of the flow system, the fluid pressure in chamber 162 acting on surface 166 is greatly reduced. The spring 172 is now able to overcome this force and open valve 164.

When switch 226 is in the open position causing bypass valve 164 to be closed, fuel from chamber 44 cannot flow through conduit 118. Therefore, all the metered fuel from the fuel control is delivered to the gas turbine engine. Since the pressure drop across flow valve 38/42 is maintained constant by diaphragm 78 and spring 90 and the flow area of the identical flow valve 46/48 is always the same as the flow area of valve 38/42, the pressure drop across valve 46/48 is the same as the pressure drop across valve 38/42, resulting in a constant pressure drop from inlet 30 to outlet 60.

When switch 226 is in the closed position causing bypass valve 164 to be open, fuel is allowed to flow past bypass valve 100, through conduit 118 and 119 and to the pump inlet. The spring-loaded bypass valve diaphragm 124 and the bypass valve 100 are designed to maintain a constant pressure differential across the diaphragm 124, this pressure differential being lower than the pressure drop normally maintained across the metered flow valve 46/48. With the bypass conduit 118 open to flow, the pressure drop maintained across the engine flow valve 46/48 is equal to the pressure differential maintained across diaphragm 124, which, as described above, is constant and at a lower value than the pressure drop across the metered flow valve 38/42. This results in fuel flow to the engine and fuel flow bypassed to the pump inlet being constant percentages of the fuel delivered to the trimming valve by the fuel control. The percentage of metered fuel flow bypassed to the pump inlet is adjustable by varying the spring load on the bypass valve diaphragm 124 by rotating member 140, which will, in turn by changing the load of spring 128, change the pressure drop across the engine flow valve.

The operation of the trimming valve, which bypasses a constant percentage of metered fuel to the pump inlet, can be verified by a mathematical derivation, starting with the well known equation $$W_f = KA\sqrt{\Delta P}$$

wherein:

$W_f$=flow rate,
K=flow constant for valve,
A=flow area,
$\sqrt{\Delta P}$=square root of the pressure drop across the flow area.

That is, by such a derivation, it can be shown that, because area 46/48 and area 38/42 are always equal, a constant percentage of fuel entering inlet 30 passes through valve 46/48 and on to the gas turbine engine inlet 72.

Figure 2:
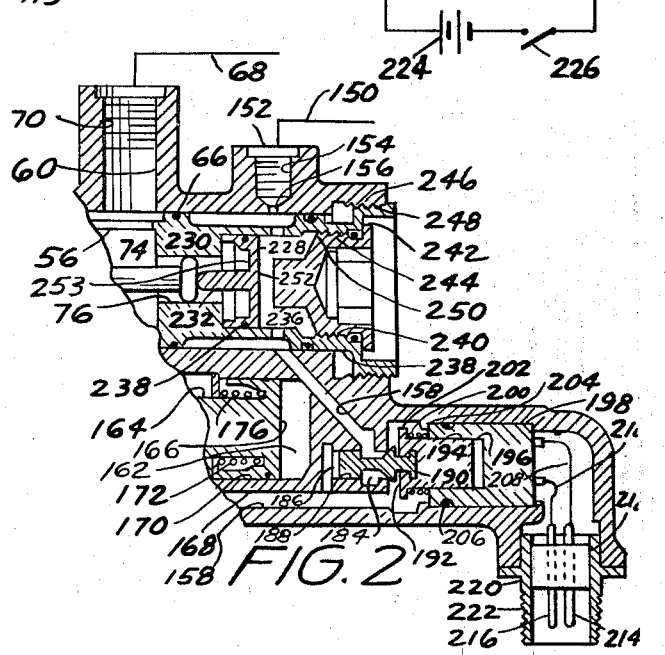
FIG. 2 is a fragmentary cross-sectional view illustrating a modification of the invention shown in FIG. 1.

A modification of the FIG. 1 fuel trimming valve is illustrated in FIG. 2, with the same reference numerals being applied to identical parts in FIG. 1. The purpose of the modification is to substantially decrease the pressure drop through the fuel trimming valve when it is not bypassing fuel back to pump inlet, this being accomplished by the use of a reset piston 228 slidably mounted in cylinder 230.

A projection 232 formed on the piston 228 is made to engage shaft 40 adjacent guides 74. O-ring seal 234 is provided around piston 228 to prevent leakage of fuel from chamber 50. A stop mechanism 236 provided for piston 228 has external threads 238 for engaging internal threads 240 formed on member 242 having external threads 246 for engaging internal threads 248 formed on housing 11. O-ring seal 244 prevents leakage around mechanism 236, and O-ring seal 250 prevents leakage around member 242.

With the solenoid valve 184 closed, high pressure fuel from conduit 150 enters inlet 152 and acts on surface 252 of piston 228. This force created on piston 228, being greater than the force created by the fluid pressure from chamber 50 acting on surface 253, forces projection 232 to engage shaft 40 opening valves 38/42 and 46/48. With the flow area of the valves enlarged, the pressure drop therethrough is greatly reduced.

When the solenoid coil 198 is energized, solenoid valve 184 is opened, causing a reduction in the fluid pressure acting on surface 252. Piston 228 is pushed away from shaft 40 and into stop 236 by the fluid pressure from chamber 50 acting on surface 253. With the piston in this position, shaft 40 with valves 38/42 and 46/48 are free to function as described previously.

It should also be stated that the design of the fuel trimming valve is such that, except for the close fitted solenoid valve in its sleeve, it will operate in unfiltered fuel, the back-up pistons that operate in dirty fuel being protected by the diaphragms. Furthermore, the fact that the pressure drop is across both the back-up piston and the diaphragm results in an essentially reliable, fail-proof unit. Any malfunction of the unit must result from a double failure; that is, failure of the diaphragm and freezing of the piston by contaminant.

The invention further includes the advantage of being inherently self-compensating for changes in fuel density and changes in spring modulus due to temperature, since both spring 90 and 128 are constructed of the same material. This means that the percentage of metered fuel delivered to the engine and the percentage bypassed to the fuel pump inlet will not vary because of changes in the specific gravity of the fuel delivered to the unit or changes in fuel specific gravity or spring modulus due to a temperature change.

The invention, including the prefered embodiment and modifications thereof, has been described in such clear and concise terms as to enable anyone skilled in the art to practice the same. Since other modifications may be possible within the scope of the invention, no limitations are intended except as recited in the appended claims.

What we claim as our invention is:

1. Mechanism for at times reducing the amount of fuel supplied to a fuel utilizing device from a fuel controlling source, said mechanism comprising a housing, a fuel inlet and first and second fuel outlets in said housing, means for connecting said inlet to the source and said first outlet to the utilizing device, a first conduit in said housing communicating said inlet with said first outlet, first valve means in said first conduit, a second conduit in said housing communicating said first conduit and said second outlet, and second valve means in said second conduit for at times passing therethrough a constant percentage of fuel that would otherwise flow to said first outlet, said first valve means comprising a first and second flow valve, said flow valves being connected for simultaneous operation to maintain the flow areas thereof equal, said second flow valve being downstream in said first conduit from said first flow valve.

2. Mechanism such as that recited in claim 1, wherein said first and second flow valves are formed on a common element.

3. Mechanism such as that recited in claim 1, wherein a first pressure responsive means responsive to the pressure differential across said first flow valve fixedly secured to said first flow valve maintains a constant pressure differential thereacross.

4. Mechanism such as that recited in claim 3, wherein said second conduit is connected to said first conduit immediately upstream of said second flow valve, said second valve means comprises a bypass valve, and a second pressure responsive means responsive to the pressure differential across said second flow valve is fixedly secured to said bypass valve for maintaining a constant pressure differential across said second flow valve.

5. Mechanism such as that recited in claim 4, wherein an external adjustment is provided for said second pressure responsive means to vary said pressure differential across said bypass valve.

6. Mechanism such as that recited in claim 4, wherein a spring-loaded shut-off valve is provided for said second conduit downstream of said bypass valve.

7. Mechanism such as that recited in claim 6, wherein high pressure filtered fuel communicated through a third conduit from any convenient source acts on said shut-off valve to seat the same and prevent any flow through said second conduit.

8. Mechanism such at that recited in claim 7, wherein a filtered fuel restriction is contained upstream in said third conduit and a solenoid actuated valve is contained downstream in said third conduit and wherein said shut-off valve will be closed when said high pressure filtered fuel acts on said shut-off valve and said solenoid valve is closed and said shut-off valve will be open allowing flow through said second conduit when said solenoid valve is open and passing fuel from said high pressure filtered source.

References Cited

UNITED STATES PATENTS

| | | | |
|---|---|---|---|
| 2,714,803 | 8/1955 | Abild | 137—26 X |
| 2,774,414 | 12/1956 | Machlanski | 137—29 X |
| 3,167,082 | 1/1965 | Oliphant | 137—18 |
| 3,173,468 | 3/1965 | McCombs | 137—26 X |
| 3,303,867 | 2/1967 | Hill | 137—36 X |
| 3,374,800 | 3/1968 | Wheeler | 137—36 X |

CLARENCE R. GORDON, Primary Examiner

U.S. Cl. X.R.

60—39.25, 39.28